US012693192B2

(12) United States Patent
K et al.

(10) Patent No.: US 12,693,192 B2
(45) Date of Patent: Jul. 28, 2026

(54) SYSTEM AND METHOD FOR DETERMINING CONDITION OF SLEEVE BEARING

(71) Applicant: ABB Schweiz AG, Baden (CH)

(72) Inventors: Ravi Naidu K, Bangalore (IN); Maciej Orman, Radziszów (PL); Prasad Mulay, Satpur Nashik (IN)

(73) Assignee: ABB Schweiz AG, Baden (CH)

( * ) Notice: Subject to any disclaimer, the term of this patent is extended or adjusted under 35 U.S.C. 154(b) by 123 days.

(21) Appl. No.: 18/604,643

(22) Filed: Mar. 14, 2024

(65) Prior Publication Data

US 2024/0310244 A1 Sep. 19, 2024

(30) Foreign Application Priority Data

Mar. 15, 2023 (IN) .............................. 202341017500

(51) Int. Cl.
G01M 13/04 (2019.01)

(52) U.S. Cl.
CPC .................................. G01M 13/04 (2013.01)

(58) Field of Classification Search
CPC ....... G01M 13/04; F16C 17/24; F16C 17/243; F16C 17/246
See application file for complete search history.

(56) References Cited

U.S. PATENT DOCUMENTS

| | | | |
|---|---|---|---|
| 5,336,996 A | 8/1994 | Rusnak | |
| 7,772,870 B2 * | 8/2010 | Inamura | H02K 11/27 |
| | | | 324/765.01 |

| | | | |
|---|---|---|---|
| 2016/0125719 A1 * | 5/2016 | Murphy | G08B 21/187 |
| | | | 340/682 |
| 2017/0140579 A1 * | 5/2017 | Heqing Sun | G01R 31/343 |
| 2018/0156691 A1 * | 6/2018 | Ehrhardt | F16C 41/00 |
| 2019/0100966 A1 * | 4/2019 | Parkin | E21B 7/062 |
| 2021/0310901 A1 * | 10/2021 | Decook | G01F 23/296 |

(Continued)

FOREIGN PATENT DOCUMENTS

| | | |
|---|---|---|
| JP | 5-30716 | 2/1993 |
| JP | 9-233769 A | 9/1997 |
| JP | 2005-224003 A | 8/2005 |

OTHER PUBLICATIONS

European Patent Office, Extended European Search Report in European Patent Application No. 24163786.7, 8 pp. (Aug. 7, 2024).

(Continued)

*Primary Examiner* — Dominic E Hawkins
(74) *Attorney, Agent, or Firm* — Fitch Even Tabin & Flannery LLP

(57) ABSTRACT

A system and method for determining condition of a sleeve bearing in a rotating machine include one or more magnetic sensors and a processor. The one or more magnetic sensors are adapted to be mounted on at least a body of a rotating machine or proximate to a sleeve bearing thereof. The processor is electrically and communicatively coupled to the one or more magnetic sensors and configured to receive magnetic flux measurement from the one or more magnetic sensors. The magnetic flux measurement is made in at least one of: proximate to the sleeve bearing or body of the rotating machine. The processor is configured to determine the condition of sleeve bearing based on the magnetic flux measurement.

17 Claims, 4 Drawing Sheets

(56)     References Cited

U.S. PATENT DOCUMENTS

| | | | | |
|---|---|---|---|---|
| 2022/0260985 A1 * | 8/2022 | Gabaldon | ............. | F01D 21/003 |
| 2022/0368199 A1 * | 11/2022 | Noda | ................... | H02K 5/1732 |
| 2023/0314281 A1 * | 10/2023 | Wall | ........................ | F01D 17/06 |
| | | | | 701/100 |

OTHER PUBLICATIONS

Examination Report for related Indian Application No. 202341017500; dated Mar. 19, 2026, 7 pages.

* cited by examiner

200

250

SYSTEM AND METHOD FOR DETERMINING CONDITION OF SLEEVE BEARING

CROSS-REFERENCE TO RELATED APPLICATIONS

The instant application claims priority to Indian patent application Ser. No. 202341017500, filed Mar. 15, 2023, which is incorporated herein in its entirety by reference.

FIELD OF THE DISCLOSURE

The present disclosure generally relates to sleeve bearing monitoring and, more particularly, to a system and a method for determining condition of sleeve bearing based on magnetic flux.

BACKGROUND OF THE INVENTION

Bearings are important mechanical component in rotating machines and are used to minimize friction between rotating and stationary parts in the rotating machines. In general, sleeve bearings facilitate motion between two components, reduce friction and absorb vibration in the rotating machine. Sleeve bearings are generally oil lubricated bearings where shaft load of the rotating machine is supported by oil film pressure between the shaft and sleeve bearing of the rotating machine. Most common failures in the sleeve bearings are due to instability produced by oil whirl, oil whip, wear and increased bearing clearance. Such instabilities result in increasing shaft vibration and oil temperature.

In view of the above discussion, there is a need to determine condition of sleeve bearings in rotating machines with components that enable easy installation, cost effective and capable of being installed in existing rotating machines.

The information disclosed in this background of the disclosure section is only for enhancement of understanding of the general background of the invention and should not be taken as an acknowledgement or any form of suggestion that this information forms the prior art already known to a person skilled in the art.

BRIEF SUMMARY OF THE INVENTION

In an embodiment, a system for determining condition of a sleeve bearing in a rotating machine is disclosed. The system includes one or more magnetic sensors, and a processor. The one or more magnetic sensors are adapted to be mounted on at least a body of the rotating machine or proximate to a sleeve bearing of a rotating machine. The processor is electrically and communicatively coupled to the one or more magnetic sensors. The processor is configured to receive a magnetic flux measurement from each magnetic sensor of the one or more magnetic sensors. The magnetic flux measurement is made at least one of: proximate to the sleeve bearing or the body of the rotating machine. The processor is configured to determine the condition of the sleeve bearing based on the magnetic flux measurement.

In another embodiment, a method for determining condition of a sleeve bearing in a rotating machine is disclosed. The method includes receiving, by a processor, a magnetic flux measurement from each magnetic sensor of the one or more magnetic sensors. The magnetic flux measurement is made at least one of: proximate to the sleeve bearing or the body of the rotating machine. The method includes determining, by the processor, a condition of the sleeve bearing based on the magnetic flux measurement.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE SEVERAL VIEWS OF THE DRAWING(S)

The accompanying drawings, which are incorporated in and constitute a part of this disclosure, illustrate exemplary embodiments and, together with the description, serve to explain the disclosed principles. The same numbers are used throughout the figures to reference like features and components. Some embodiments of device and/or methods in accordance with embodiments of the present subject matter are now described, by way of example only, and with reference to the accompanying figures, in which.

Figure 1A:
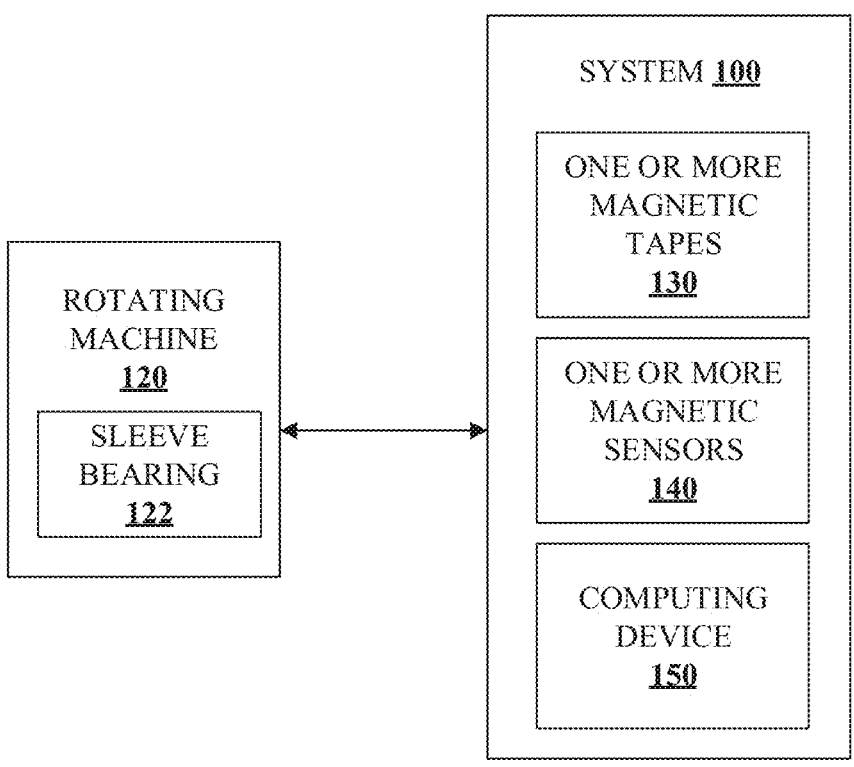
FIG. 1A illustrates a block diagram representation of a system for determining condition of sleeve bearing in a rotating machine, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION OF THE INVENTION

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
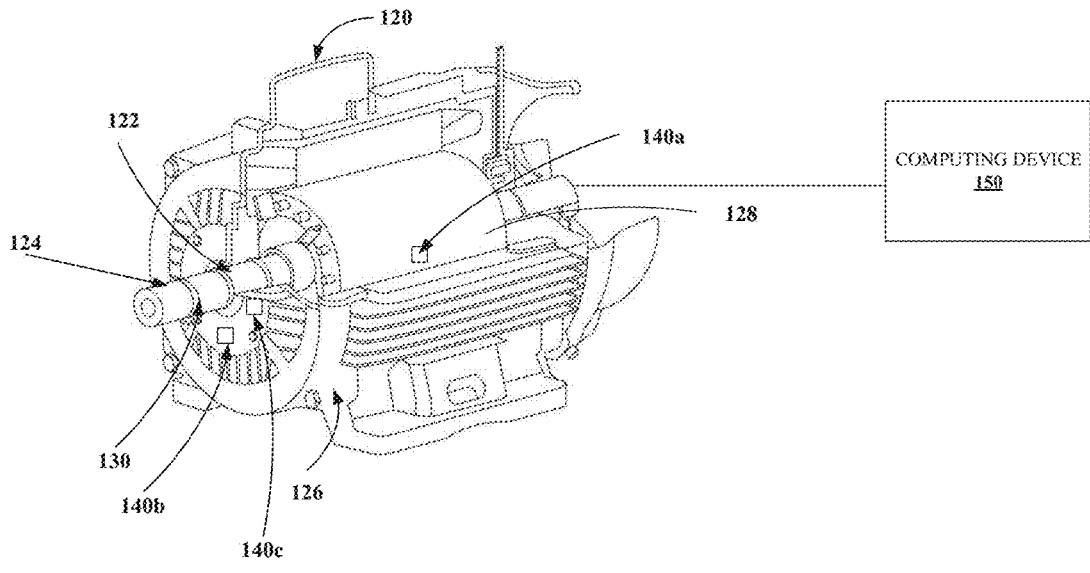
FIG. 1B illustrates a schematic representation of a rotating machine with magnetic sensors for determining condition of the sleeve bearing in the rotating machine, in accordance with an embodiment of the present disclosure.

Referring now to FIG. 1A in conjunction with FIG. 1B, a block diagram representation of a system 100 used for determining condition of a sleeve bearing 122 in a rotating machine 120 is illustrated in accordance with an embodiment of the present disclosure.

The term 'rotating machine' as used herein refers to energy conversion machines which comprise a rotating component (i.e., rotor) and a stationary component (i.e., stator). As such, the rotating machine includes both electrical and non-electrical rotating machines equipped with a sleeve bearing such as, the sleeve bearing 122 depicted in FIG. 1B for reducing friction and absorbing vibration in the rotating machine. In an example, any machine that performs electromechanical conversion of energy by rotational motion are rotating electric machines. The rotating machine may be an Alternating Current (AC) machine or a Direct Current (DC) machine such as, electric motors, electrical generators, motor generators, and the like. In another example, any machine that uses kinetic energy to move fluids, gases, and other process materials such as, gas compressors, turbines, pumps, fans, blowers, and gear boxes, in oil and gas industries are non-electrical rotating machines.

The present disclosure is explained herein with reference to a rotating electric machine such as, an induction motor shown in FIG. 1B. It shall be noted that rotating machine 120 is interchangeably referred to hereinafter as rotating electric machine 120. However, it shall be noted that various embodiments of the present invention may be practiced with other rotating machines of non-electrical nature as will be explained in detail hereinafter. It shall be noted that the rotating machine 120 is depicted for exemplary purposes and the rotating machine 120 may include fewer or more components than those depicted in FIGS. 1A and 1B.

Moreover, only components of the rotating machine 120 that are essential for the present disclosure are explained herein and the description of other components of the rotating machine 120 are not provided herein for the sake of brevity.

In an embodiment, the condition of the sleeve bearing 122 is one of: a normal condition, an abnormal condition, and a faulty condition. The normal condition indicates that the sleeve bearing 122 has not worn out and there are no oil instabilities in the sleeve bearing 122 whereas the abnormal condition of the sleeve bearing 122 indicates a deviation from normal operating characteristics of the sleeve bearing 122. The faulty conditions indicate at least one of an oil whirl fault, oil whip fault and a bearing clearance fault in the sleeve bearing 122. In an embodiment, the condition of the sleeve bearing 122 in the rotating machine 120 may be determined by at least one of: (1) monitoring a movement of a shaft 124, and (2) a leakage flux generated by the rotating machine 120. The leakage flux is a part of magnetic flux generated from rotating electrical machines that do not follow a desired path in a magnetic circuit and is also referred to as stray flux. As such, generation of leakage flux is inherent nature of rotating electric machines such as, the rotating machine 120 (shown in FIG. 1B) due to existing air gap between stator (i.e., journal bearing 126) and rotor (i.e., the shaft 124) of the rotating machine 120. This leakage flux may be used to identify condition of the sleeve bearing of the rotating machine 120. As such, condition of sleeve bearings of rotating machines that are non-electrical nature and/or electrical nature (i.e., the rotating electric machine 120) may be determined by estimating the movement of the shaft 124.

In an embodiment, a change in magnetic flux may be used to estimate the movement of the shaft 124. More specifically, the movement of the shaft 124 in the rotating machine 120 is resolved into horizontal and vertical components for estimating the movement of the shaft 124. In an embodiment, one or more magnetic tapes 130 (hereinafter referred to as 'magnetic tapes 130') are disposed circumferentially on at least a portion of the shaft 124 of the rotating machine 120. The magnetic tapes 130 are flexible tapes formed of a plurality of poles which gives rise to a magnetic field around the magnetic tapes 130. In an example, the magnetic tapes 130 is an adhesive tape. More specifically, the magnetic tapes 130 are a magnetized rubber strip and as such clings/adheres to the shaft 124. In another example, the magnetic tapes 130 may adhere on a metal ring split in two halves. This metal ring is mounted on the shaft 124 using mechanical arrangements such as, fasteners, screws, and the like. Such an arrangement may be apt for existing rotating machines. Alternatively, during manufacturing phase, a full circular metal ring may be inserted on the shaft 124 of the rotating machine 120 and the magnetic tapes 130 may be adhered on the full circular metal ring. As such, the rotating machine 120 which are of non-electrical nature may use the magnetic tapes 130 to estimate the movement of the shaft 124. However, in the rotating electrical machines 120, the estimation of the movement of the shaft 124 may be used along with the leakage flux for determining the condition of the sleeve bearing 122. In other words, the condition of the sleeve bearing 122 may be accurately determined based on both the leakage flux and the estimated movement of the shaft 124. Estimating the movement of the shaft 124 is performed by the computing device 150 which is explained in detail with reference to FIG. 3 and schematic arrangements of the magnetic tapes 130 are explained next with reference to FIGS. 2A and 2B.

Figure 2A:
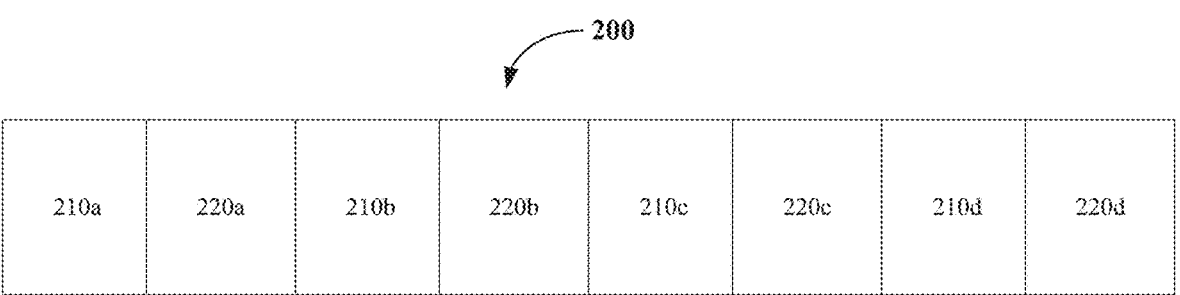
FIG. 2A illustrates an arrangement of a plurality of first poles and a plurality of a second poles in a magnetic tape, in accordance with an embodiment of the present disclosure.
Figure 2B:
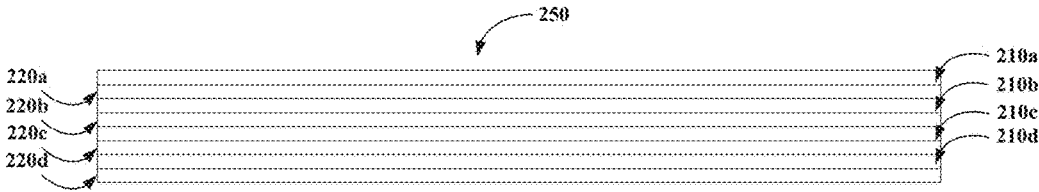
FIG. 2B illustrates an arrangement of a plurality of first poles and a plurality of a second poles in a magnetic tape, in accordance with another embodiment of the present disclosure.

Referring now to FIGS. 2A and 2B, an arrangement of a plurality of first poles and a plurality of a second poles on the magnetic tapes 200 and 250 are illustrated. Each magnetic tape of the magnetic tapes 130 comprises a plurality of first poles and a plurality of second poles. In an example, the plurality of first poles are north poles and the plurality of second poles are south poles. The plurality of first poles and the plurality of south poles may be arranged in different ways to determine the movement of the shaft 124 within the sleeve bearing 122 in the rotating machine 120. In an embodiment, each first pole of the plurality of first poles is alternatively arranged with each second pole of the plurality of second poles in a lateral direction along a length of a magnetic tape. As shown in FIG. 2A, a north pole is alternated with a south pole continuously in the lateral direction of the magnetic tape 200. The magnetic tape 200 is an example of the magnetic tape 130 shown in FIGS. 1A and 1B. Such a lateral arrangement of the first poles 210a, 210b, 210c, 210d and the second poles 220a, 220b, 220c, 220d in an alternate manner enables detection of a speed of the shaft 124 and a radial movement of the shaft 124 within the sleeve bearing 122. Such an alternate arrangement of North-South (NS)—NS magnetic poles along the length of the magnetic tape 200 eliminates the need for a separate key phasor for orbit plots in the analysis of sleeve bearing 122 as will be explained in detail later. It shall be noted that a number of first poles and a number of second poles are shown for exemplary purposes and a number of first poles and second poles may be lesser than or greater than those depicted in FIG. 2A.

In an embodiment, each first pole of the plurality of first poles is alternatively arranged with each second pole of the plurality of second poles in a vertical direction. As shown in FIG. 2B, each first pole (i.e., first poles 210a, 210b, 210c, 210d) is vertically alternated with a second pole (i.e., second poles 220a, 220b, 220c, 220d) on a magnetic tape 250. Such a vertical arrangement of the first poles 210a, 210b, 210c, 210d and the second poles 220a, 220b, 220c, 220d in an alternate manner enables detection of an axial movement of the shaft 124 within the sleeve bearing 122. The magnetic tape 250 is an example of the magnetic tapes 130 depicted in FIGS. 1A-1B.

In an example, the magnetic tape 200 alone may be disposed circumferentially on a portion of the shaft 124. In another example, the magnetic tape 250 alone may be disposed circumferentially on a portion of the shaft 124. In yet another example, the magnetic tapes 200 and 250 may be circumferentially arranged consecutively on the shaft 124 to encircle the shaft 124 for determining the axial and radial movement of the shaft 124 within the sleeve bearing 122. Further, the arrangement of the plurality of the first poles and the plurality of the second poles on the magnetic tapes 200 and 250 precludes the need for a key phasor by accurately indicating timing information, phase angle, frequency of rotation and direction measurements which are vital for diagnostics (i.e., determining condition of the sleeve bearing 122) of the rotating machine 120. In an example, if the magnetic tape 200 has 6 poles (i.e., 3 north poles alternating with 3 south poles) and if there is an issue with bearing clearance at a specific location within the sleeve bearing, location of the issue may be accurately identified from the positioning of the plurality of poles of the magnetic tape 200. For instance, each pole (i.e., north and south pole) are alternatively arranged to cover 60° and the location may be identified from angle of the pole passing through the location. Moreover, the arrangement of the plurality of poles in the magnetic stripes 200 and 250 ensure that a rotation frequency ($f_R$) of the shaft 124 and a line frequency ($f_L$) of the rotating machine 120 do not coincide. In other words, peaks in the rotational frequency ($f_L$) of the shaft 124 as determined from the magnetic flux induced due to the magnetic tapes 130 increase with number of poles in the magnetic tapes 130.

It shall be noted that each of the one or more magnetic tapes 130 completely encircle the shaft 124 of the rotating machine 120. However, the magnetic tapes 130 do not cover entire length of the shaft 124 but are restricted to a certain length circumferentially such that the magnetic tapes 130 give rise to suitable magnetic fields.

As already explained, magnetic flux measurement from the rotating machine 120 may be used to determine the condition of the sleeve bearing 122 within the rotating machine 120. More specifically, the leakage flux from the rotating machine 120 and/or the magnetic flux induced due to the magnetic tapes 130 are used to determine the condition of the sleeve bearing 122. In an embodiment, one or more magnetic sensors 140 (shown in FIG. 1B as 140a, 140b, 140c and collectively referred to as 'one or more magnetic sensors 140') are used for measuring the magnetic flux. Each magnetic sensor 140a, 140b, 140c of the one or more magnetic sensors 140 may be used to determine magnetic fields around the rotating machine 120. The one or more magnetic sensors 140 may be analog sensors or digital sensors (e.g., MEMS-based magnetic sensors).

In an embodiment, a magnetic sensor 140a is disposed on the body 128 of the rotating machine 120 as shown in FIG. 1B. It shall be noted that in some existing rotating electrical machines such as, the rotating machine 120 include a magnetic sensor on the body 128 of the rotating machine 120. In an example, the magnetic sensor 140a mounted on the body of the rotating machine 120 and is used for monitoring condition of the rotating machine 120, for example, to identify broken rotor bars of the rotating machine 120. In an embodiment, the magnetic sensor 140a may be adapted to also measure the leakage flux generated from the rotating machine 120 which is further processed to determine the condition of the sleeve bearing 122. It shall be noted that although only magnetic sensor 140a is depicted to be mounted on the body 128 of the rotating machine 120, more than one magnetic sensor may be mounted at plurality of different locations of the body 128 and a plurality of different angles of the rotating machine 120 for measuring the leakage flux generated by the rotating machine 120.

In an embodiment, the one or more magnetic sensors 140 are mounted proximate to the sleeve bearing 122 to determine the condition of the sleeve bearing 122. More specifically, each magnetic sensor of the one or more magnetic sensors 140 may be arranged at different locations on the rotating machine 120. In an example, a magnetic sensor may be mounted anywhere on end shields of the rotating machine 120. In another example, a magnetic sensor may be mounted anywhere on a frame of the rotating machine 120. In yet another example, a magnetic sensor 140b is mounted within a seal housing of a compressor. In general, the one or more magnetic sensors 140 may be adapted to be mounted at any location of the rotating machine 120 and at any direction subject to receiving the magnetic flux measurement (i.e., leakage flux generated by the rotating machine 120 or the magnetic flux induced due to the magnetic tapes 130) for processing and determining the condition of the sleeve bearing 122. In this example representation, magnetic sensors 140b and 140c are mounted on end cover of the rotating machine 120. Its shall be noted that, the one or more magnetic sensors 140 may be enclosed in a protective housing and mounted on any location, for example, a housing near stator windings (not shown in FIG. 1B) of the rotating machine 120. It shall be noted that when a plurality of magnetic sensors, for example, the magnetic sensors 140*b*, 140*c* are used, the magnetic flux measurement from the magnetic sensors 140*b*, 140*c* may be combined to determine the condition of the sleeve bearing 122, thereby providing more accuracy in determining the condition of the sleeve bearing 122. As such, the magnetic flux measurement is made proximate to the sleeve bearing 122 and/or the body 128 of the rotating machine 120. The magnetic flux measurement from each magnetic sensor of the one or more magnetic sensors 140 is provided to the computing device 150. The processing of the magnetic flux measurement by the computing device 150 is explained next with reference to FIG. 3.

Figure 3:
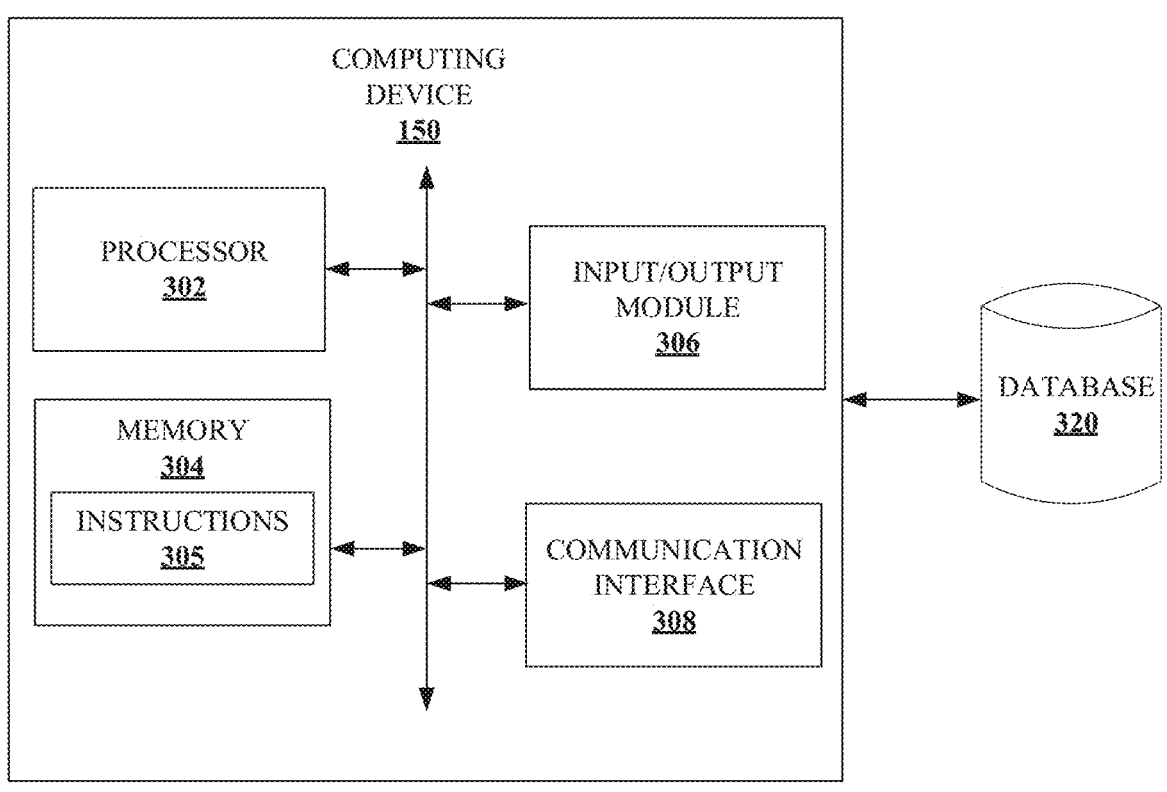
FIG. 3 is a block diagram of a computing device for determining condition of sleeve bearing in a rotating machine, in accordance with an embodiment of the present disclosure.

FIG. 3 illustrates the computing device 150 for determining condition of sleeve bearing, in accordance with an embodiment of the present disclosure. In an embodiment, the computing device 150 is a standalone processor embodied within a control system capable of controlling the operations of an industrial process in which the rotating machine 120 is used. In another embodiment, the computing device 150 may be an edge device such as, an edge server capable of receiving magnetic flux measurement from each magnetic sensor of the system 100 related to leakage flux and/or magnetic flux induced due to the one or more magnetic tapes 106 for determining the condition of the sleeve bearing. In yet another embodiment, the computing device 150 is a control system capable of controlling the rotating machine 120.

The computing device 150 is depicted to include a processor 302, a memory 304, an Input/Output module 306, and a communication interface 308. It shall be noted that, in some embodiments, the computing device 150 may include more or fewer components than those depicted herein. The various components of the computing device 150 may be implemented using hardware, software, firmware or any combinations thereof. Further, the various components of the computing device 150 may be operably coupled with each other. More specifically, various components of the computing device 150 may be capable of communicating with each other using communication channel media (such as buses, interconnects, etc.). It is also noted that one or more components of the computing device 150 may be implemented in a single server or a plurality of servers, which are remotely placed from each other.

In one embodiment, the processor 302 may be embodied as a multi-core processor, a single core processor, or a combination of one or more multi-core processors and one or more single core processors. For example, the processor 302 may be embodied as one or more of various processing devices, such as a coprocessor, a microprocessor, a controller, a digital signal processor (DSP), a processing circuitry with or without an accompanying DSP, or various other processing devices including, a microcontroller unit (MCU), a hardware accelerator, a special-purpose computer chip, or the like.

In one embodiment, the memory 304 is capable of storing machine executable instructions, referred to herein as instructions 305. In an embodiment, the processor 302 is embodied as an executor of software instructions. As such, the processor 302 is capable of executing the instructions 305 stored in the memory 304 to perform one or more operations described herein. The memory 304 can be any type of storage accessible to the processor 302 to perform respective functionalities, as will be explained in detail with reference to FIGS. 4A-4B to 5. For example, the memory 304 may include one or more volatile or non-volatile memories, or a combination thereof. For example, the memory 304 may be embodied as semiconductor memories, such as flash memory, mask ROM, PROM (programmable ROM), EPROM (erasable PROM), RAM (random access memory), etc. and the like. Further, the memory 304 may store an Artificial Intelligence (AI) model for predicting the condition of the sleeve bearing 122.

In an embodiment, the processor 302 is configured to execute the instructions 305 for: (1) transforming the leakage flux generated by the rotating machine 120 to a spectral representation, (2) analyzing the spectral representation at one or more frequencies, (3) identifying the faulty condition of the sleeve bearing 122 based on one or more spectral signatures at the one or more frequencies, (4) determining the condition of the sleeve bearing 122 based on the spectral representation, (5) tracking a change in the magnetic flux induced due to the one or more magnetic tapes 130 over a defined time period, (6) estimating a deviation in a centerline of the shaft 124 for the defined time period based on the change in the magnetic flux, (7) determining the condition of the sleeve bearing 122 based on the deviation. The processor 302 may further be configured to execute the instructions 305 to (1) transmit information related to the condition of the sleeve bearing 122 to a remote device, and/or (2) initiate an alarm signal.

In an embodiment, the I/O module 306 may include mechanisms configured to receive inputs from and provide outputs to peripheral devices such as, a centralized server monitoring conditions of a plurality of rotating machines such as, the rotating machine 120 and/or an operator of the computing device 150. The term 'operator of the computing device 150' as used herein may refer to one or more individuals, whether directly or indirectly, associated with managing the rotating machine 120. To enable reception of inputs and provide outputs to the computing device 150, the I/O module 306 may include at least one input interface and/or at least one output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, and the like.

The communication interface 308 may include mechanisms configured to communicate with external entities, for example, the rotating machine 120. In other words, the communication interface 308 is configured to receive the magnetic flux measurement from each magnetic sensor of the one or more magnetic sensors 140 for processing by the processor 302. As already explained, the magnetic flux measurement is made in at least one of: proximate to the sleeve bearing 122 or the body 128 of the rotating machine 120. In an embodiment, the magnetic flux measurement is forwarded to the processor 302 which performs one or more operations described herein to determine the condition of the sleeve bearing 122. It shall be noted that the magnetic flux measurement received from the one or more magnetic sensors 140 may be conditioned prior to processing by the processor 302. Accordingly, the computing device 150 may include other components for pre-processing the magnetic flux measurement received from the one or more magnetic sensors 140, for example, a signal conditioner (not shown in FIG. 3). In general, signal conditioning is a process of manipulating an analog signal (here the 'magnetic flux measurement') in such way that it is optimized for further processing. As such, signal conditioning of the magnetic flux measurement may include, but not limited to, amplification, filtering, amplifying, converting, range matching, isolation and any other processes required to make sensor outputs from the magnetic sensors suitable for processing after conditioning. In general, such signal conditioning of the magnetic flux measurement may be performed to eliminate undesired noise, increasing resolution, increasing Signal-to-Noise Ratio (SNR), conversion to other form, and the like.

The computing device 150 is depicted to be in operative communication with a database 320. In one embodiment, the database 320 is configured to store one or more spectral signatures for identifying faulty conditions. The term 'spectral signature' as used herein refers to a pattern of a magnetic flux measurement at specific frequencies representing a specific condition of the sleeve bearing 122. In other words, the spectral signature captures vibrations which may be introduced due to oil instabilities or bearing clearance issues of the sleeve bearing 122. More specifically, the spectral signatures show strong harmonic and sub harmonics peaks at specific frequencies. In this disclosure, the spectral signatures are used to determine condition of the sleeve bearing. In an example, a spectral signature indicating oil whirl fault shows strong sub harmonic peak anywhere between −40 to −60 dB at fault frequencies.

The database 320 may include multiple storage units such as hard disks and/or solid-state disks in a redundant array of inexpensive disks (RAID) configuration. In some embodiments, the database 320 may include a storage area network (SAN) and/or a network attached storage (NAS) system. In one embodiment, the database 320 may correspond to a distributed storage system, wherein individual databases are configured to store custom information, such as sleeve bearing monitoring policies, list of rotating machines, condition of sleeve bearings over time, details of fault conditions in sleeve bearings, historical data of magnetic flux measurements, specification of sleeve bearings, rotating machines, etc.

In some embodiments, the database 320 is integrated within the computing device 150. For example, the computing device 150 may include one or more hard disk drives as the database 320. In other embodiments, the database 320 is external to the computing device 150 and may be accessed by the computing device 150 using a storage interface (not shown in FIG. 3). The storage interface is any component capable of providing the processor 302 with access to the database 320. The storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 302 with access to the database 320.

As already explained, the communication interface 308 is configured to receive the magnetic flux measurement from each magnetic sensor of the one or more magnetic sensors 140 and forwards the magnetic flux measurement to the processor 302. The processor 302 in conjunction with the instructions in the memory 304 are configured to process the magnetic flux measurement for determining the condition of the sleeve bearing 122.

As already explained the magnetic flux measurement may correspond to a leakage flux generated by the rotating machine 120 (i.e., a rotating electrical machine) or a magnetic flux measurement determined by the magnetic sensors 140 due to the one or more magnetic tapes 130 on the shaft 124.

In an embodiment, the processor 302 is configured to receive the leakage flux as magnetic flux measurement from the magnetic sensor 140a. The processor 302 in conjunction with the instructions 305 stored in the memory 304 is configured to process the leakage flux to determine the condition of the sleeve bearing. More specifically, the leakage flux may be used to identify faulty conditions in the sleeve bearing 122 of the rotating machine 120. Mostly, faulty conditions in the sleeve bearing 122 are due to instability produced by oil and bearing clearance and as such, these faulty conditions result in increased vibration of the shaft 124. More specifically, these faulty conditions may be due to excessive wear or clearance of the sleeve bearing 122, change in oil properties, change in oil pressure, change in oil temperature, design issues in manufacturing, external vibratory force, etc. Some examples of the faulty conditions in the sleeve bearing 122 include, but not limited to, oil whirl fault, oil whip fault, bearing clearance fault, and the like.

The oil whirl fault occurs when fluid entrained in a space between the shaft 124 and surface of the sleeve bearing 122 begins to circulate with an average velocity of one-half of a speed of the shaft 124. The oil whip fault occurs in the rotating machine 120 when an oil whirl frequency coincides with a natural frequency of the rotating machine 120 and becomes locked into the natural frequency of the rotating machine 120. As such, both oil whirl and whip introduce self-excited vibrations in the shaft 124 that result from the shaft 124 interacting with the fluid inside the sleeve bearing 122.

In an embodiment, the leakage flux generated by the rotating machine 120 is transformed to a spectral representation. More specifically, a Fast Frequency Transform (FFT) is used to transform the magnetic flux measurement (i.e., the leakage flux generated by the rotating machine 120) to a spectral representation. As such, spectral components of the spectral representation provide frequency information about the magnetic flux measurement which is used to determine a faulty condition of the sleeve bearing 122. In an embodiment, the spectral representation of the magnetic flux measurement is analyzed at one or more frequencies (F) for spectral signatures. These one or more frequencies are frequencies at which harmonic or sub harmonic peaks are observed indicating a faulty condition. These one or more frequencies are determined based on one or more of: a line frequency $(f_L)$, a rotation frequency $(f_r)$, and one or more scaling values. If there are no spectral signatures observed at the one or more frequencies, the condition of the sleeve bearing is determined as the normal condition. In an example, the processor 302 analyzes the spectral representation at the one or more frequencies, which are determined based on Equation (1) and Equations (2):

$$F_l \pm (0.38 * F_r) \text{ to} - F_l \pm (0.48 * F_r) \qquad \text{Equation (1)}$$

$$F_L \pm k F_{clearance} \qquad \text{Equation (2)}$$

$$F_{clearance} = F_r, vib/q \qquad \text{Equation (3)}$$

Where $F_l$ is the line frequency
$F_r$ is the rotation frequency
values between 0.38 and 0.48 are the scaling factor for the rotation frequency
q is 1, 1.5, 2, 2.5 . . . N in which multiples like 1, 2, 3 . . . etc., indicate harmonics and multiples like 0.5, 1.5, 2.5 . . . etc., indicate sub harmonics
k=1, 2, 3, . . .

Figure 4A:
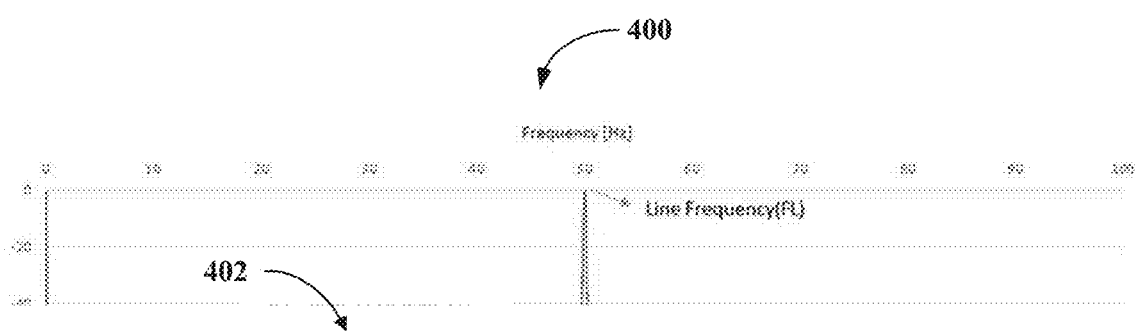
FIG. 4A illustrates a spectral representation corresponding to leakage flux of the rotating machine of FIG. 1B indicating a faulty condition, in accordance with an embodiment of the present disclosure.

An example of a spectral representation 400 of the leakage flux showing spectral signature 402 indicating faulty condition is shown in FIG. 4A. More specifically, the spectral representation 400 shows a strong subharmonic peak which is indicated by the spectral signature 402. In general, the processor 302 analyzes frequency ranges as indicated by the Equation (1) to identify spectral signatures. When spectral signatures are observed in the one or more frequencies, the spectral signatures are compared against the plurality of spectral signatures in the database 320 to identify the condition of the sleeve bearing. More specifically, the database 320 stores a plurality of spectral signatures and conditions associated with each spectral signature. In an example, 3 different spectral signatures associated with abnormal condition of the sleeve bearing is stored in the database 320. In another example, 20 different spectral signatures indicating various faulty conditions and details of fault are stored in the database 320. The spectral signature 402 shown in FIG. 4A is indicative of oil whirl fault which is determined by comparing against the spectral signatures stored in the database 320.

Figure 4B:
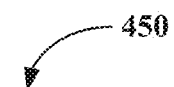
FIG. 4B illustrates a spectral representation corresponding to leakage flux of the rotating machine of FIG. 1B indicating a faulty condition, in accordance with another embodiment of the present disclosure.
Figure 4B:
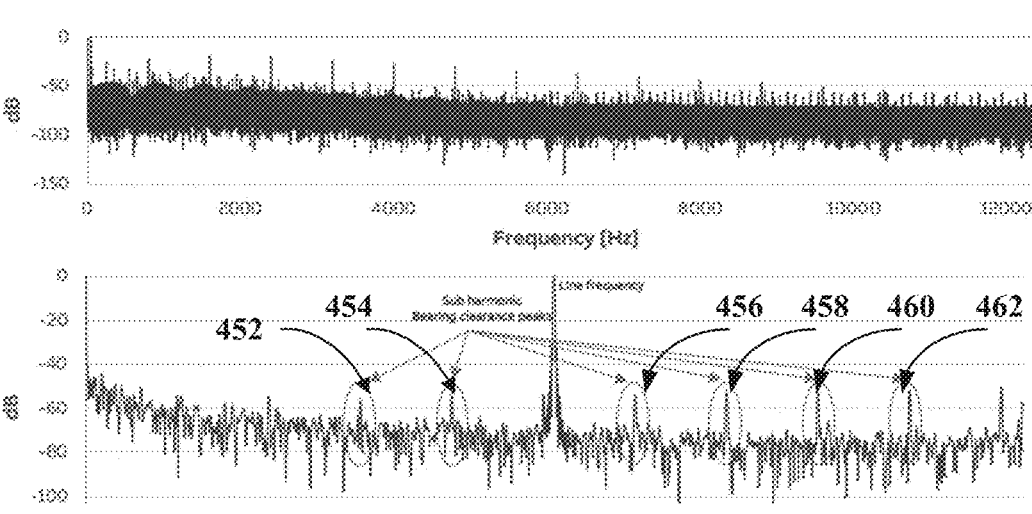

An example of a spectral representation 450 of the magnetic flux measurement showing spectral signatures 452, 454, 456, 458, 460, 462 indicating another faulty condition is shown in FIG. 4B. More specifically, the spectral representation 450 shows subharmonic peaks represented by spectral signatures 452, 454, 456, 458, 460, 462 at frequencies f1, f2, f3, f4, f5, and f6, respectively. The frequencies at which the subharmonics are identified as spectral signatures 452, 454, 456, 458, 460, 462 are shown by Equation (2). In this example representation, the spectral signatures 452, 454, 456, 458, 460, 462 identified in the spectral representation 550 indicate a bearing clearance fault.

It shall be noted that the plots 400, and 450 are exemplary and the plots 400 and 450 indicate the oil whirl fault and bearing clearance fault in the sleeve bearing 122 based on identified spectral signatures. However, it shall be noted that other spectral signatures indicative of faults in the sleeve bearing 122 may also be observed in the one or more frequencies and as such, the processor 302 would compare the spectral signature with fault spectral signatures stored in the database 320 to identify the condition of the sleeve bearing 122 and are not explained herein for the sake of brevity.

Referring back to FIG. 3, the processor 302 may be further configured to continuously track a change in the magnetic flux induced due to the magnetic tapes 130 over a defined time period. In an example, the magnetic flux from magnetic tapes 130 may be tracked over a defined time period such as, 5 minutes. As such, one or more magnetic sensors, for example, magnetic sensors 140b and 140c, are only occasionally powered for the defined time period to receive magnetic flux measurement induced due to the at least one magnetic tape. In another example, the magnetic flux from the magnetic tapes 130 may be tracked whenever the rotating machine is operational, for example, the defined time period may be 12 hours in a day when the rotating machine 120 is operational. In yet another example, the defined time period may be specified as 2 minutes when the rotating machine 120 operates with peak load condition.

The processor 302 is configured to estimate a deviation in a centerline of the shaft 124 for the defined time period based on the change in the magnetic flux measurement. More specifically, field strength at a given frequency of the rotating machine 120 is used to estimate movement of the shaft 124. In an example, change in the magnetic flux measurement received from the magnetic flux sensors 140b and 140c at a frequency of shaft rotation is used to estimate the centerline of the shaft 124. The deviation in the centerline of the shaft 124 over the defined time period represents one of: an axial movement of the shaft 124 and a radial movement of the shaft 124. As already explained with reference to FIG. 2A-2B, the arrangement of the plurality of poles in a lateral manner as shown by the magnetic tape 200 enables measurement of radial movement of the shaft 124 and the arrangement of the plurality of poles in a vertical manner enable measurement of axial movement of the shaft 124. In an embodiment, the condition of the sleeve bearing 122 is determined based on the estimation. More specifically, an orbit plot is constructed from the deviation in the centerline of the shaft 124 estimated over the defined time period. In general, the orbit plot is a visual representation of the centerline of the rotating shaft 124 and is a useful tool in diagnosing the root cause of issues associated with the rotating machine 120. As such, the orbit plot analysis uses the estimated deviation in the centerline of the shaft 124 to visualize the trajectory of the shaft 124. As such, the orbit plot provides information regarding the condition of the sleeve bearing 122. In an example, the orbit plot constructed based on the estimated deviation in the centerline of the shaft 124 may depict a circle under normal operating conditions. This indicates that oil entrained between the shaft 124 and the sleeve bearing 122 has equal stiffness and thickness in all directions, and there is some imbalance causing the centerline to move in a circle which is a normal condition. In another example, the orbit plot depicts an oval structure indicating that the shaft 124 of the rotating machine 120 is moving more in the vertical direction than in the horizontal direction. Such movement of the shaft 124 as depicted by the orbit plot may be an indication that the sleeve bearing 122 is in an abnormal condition. In other words, the sleeve bearing 122 is worn out in an oval pattern, with more vertical clearance than horizontal clearance. In yet another example, the orbit plot may indicate the shaft 124 moving in a FIG. 8 pattern. As such, the movement of the shaft 124 indicates vibration of the shaft 124 twice as fast in one direction than in the other direction. This may be caused by increased bearing clearance in one direction, or a bearing worn into an oval shape and as such, the condition of the sleeve bearing is identified as a faulty condition. It shall be noted that the magnetic flux measurement induced due to the one or more magnetic tapes 130 may be measured by the magnetic sensor 140b alone or in any combination with other magnetic sensors 140a and 140c as would be apparent to a person skilled in the art.

In an embodiment, the condition of the sleeve bearing 122 may be determined based on the leakage flux and the magnetic flux induced due to the magnetic tapes 130. Accordingly, the AI model in the memory 304 may be trained to accurately predict the condition of the sleeve bearing 122 based on the spectral signatures determined from the leakage flux and the deviation in the centerline of the shaft 124 (i.e., determined from the change in magnetic flux). Such techniques in which magnetic flux measurements are determined in different ways ensure robustness and accuracy of determining the condition of the sleeve bearing 122.

In an embodiment, the processor 302 may forward information related to the condition of the sleeve bearing 122 to the communication interface 308. The communication interface 308 may transmit the condition of the sleeve bearing 122 to a centralized server for further analysis and action, for example, data related to the condition of the sleeve bearing

122 will be stored and visualized in the form of reports. In another embodiment, the communication interface 308 may forward the condition of the sleeve bearing 122 to an alarm circuit (not shown in Figures) which generates the alarm signal. The alarm circuit may provide an audible or visual alert based on the identified condition of the sleeve bearing 122. In another embodiment, the processor 302 may forward the information related to the condition of the sleeve bearing 122 to the I/O module 306. The I/O module 306 may display an appropriate alert based on the condition of the sleeve bearing 122. For example, output interfaces such as, the ringer, the speaker and the display may be used to generate the alarm signal for the operator of the computing device 150.

It shall be noted that although the determination of the condition of the sleeve bearing 122 in a rotating machine is explained with reference to a rotating electrical machine (i.e., the rotating machine 120), various embodiments of the present disclosure may also be used in any rotating machine without electrical conduction without departing from the scope of the present disclosure. More specifically, any rotating machine which has a sleeve bearing, for example, pump, compressors and the like may also monitor the condition of the sleeve bearing 122 by mounting the magnetic tapes 130 on a rotor part. A method for determining condition of the sleeve bearing 122 by measuring magnetic flux is explained next with reference to FIG. 5.

Figure 5:
FIG. 5 is a flowchart illustrating a method for determining condition of sleeve bearing in rotating machines, in accordance with an embodiment of the present disclosure.
Figure 5:
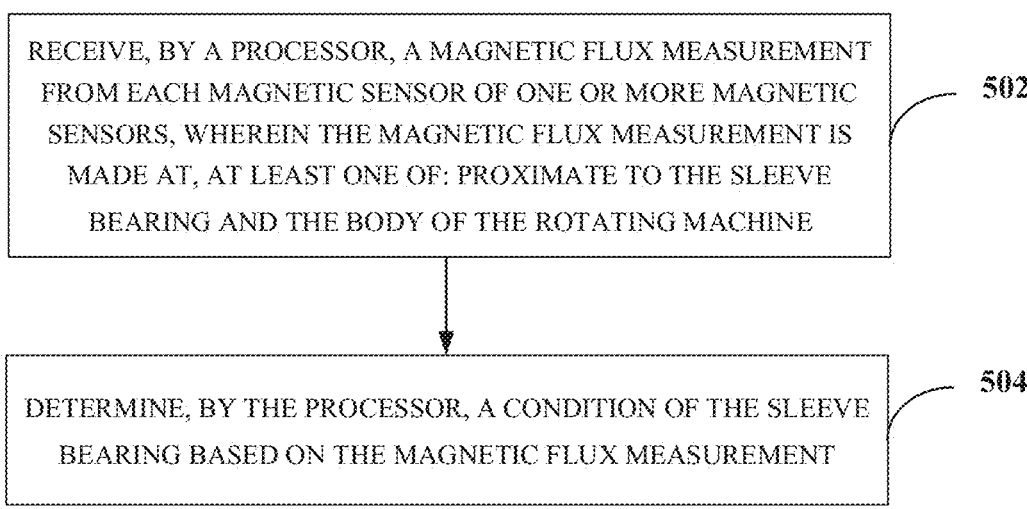

FIG. 5 is a flowchart illustrating a method 500 for determining condition of a sleeve bearing 122 in the rotating machine 120, in accordance with an embodiment of the present disclosure. The method 500 depicted in the flow diagram may be executed by, for example, the processor 302 shown in FIG. 3. Operations of the flow diagram, and combinations of operation in the flow diagram, may be implemented by, for example, hardware, firmware, a processor, circuitry and/or a different device associated with the execution of software that includes one or more computer program instructions. The operations of the method 500 are described herein with help of the processor 302 of the computing device 150. It is noted that the operations of the method 500 can be described and/or practiced by using one or more processors of a system/device other than the processor 302. The method 500 starts at operation 502

At operation 502 of the method 500, a magnetic flux measurement from each magnetic sensor of the one or more magnetic sensors (108) is received by a processor, such as, the processor 302 shown and explained with reference to FIG. 3. As already explained, the processor 302 may be embodied within a computing device, for example, a control system controlling the rotating machine 120 or maybe configured as a standalone processor configured to perform one or more of the operations described herein. In some embodiments, the processor 302 may be configured on an edge device having data processing capabilities. The magnetic flux measurement is made in at least one of: proximate to the sleeve bearing 122 or the body 128 of the rotating machine 120.

At operation 504 of the method 500, a condition of the sleeve bearing 122 is determined based on the magnetic flux measurement. The magnetic flux measurement may be due to a leakage flux generated by the rotating machine 120 and/or the magnetic flux induced due to the one or more magnetic tapes 130. In an embodiment, the leakage flux is used to determine the fault condition of the sleeve bearing 122 as explained with reference to FIGS. 3, 4A-4B. In an embodiment, the change in magnetic flux induced due to the one or more magnetic tapes 130 is used to estimate a centerline movement of the shaft 124. The estimated centerline movement is used to determine the condition of the sleeve bearing 122. The condition of the sleeve bearing 122 is one of: a normal condition, an abnormal condition, and a fault condition. The fault condition is one of an oil whirl fault, an oil whip fault, and a bearing clearance fault. In another embodiment, the leakage flux and the change in magnetic flux induced due to the one or more magnetic tapes 130 are used to determine the condition of the sleeve bearing 122. The condition of the sleeve bearing 122 is displayed on the output interface (i.e., I/O module 306) or data related to the condition of the sleeve bearing 122 may also be sent to a remote server, for visualization and report generation, using a secure communication channel.

The sequence of operations of the method 500 need not be necessarily executed in the same order as they are presented. Further, one or more operations may be grouped together and performed in form of a single step, or one operation may have several sub-steps that may be performed in parallel or in sequential manner.

The disclosed method with reference to FIG. 5, or one or more operations of the flow diagram 500 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer.

Various embodiments of the present disclosure provide numerous advantages. Embodiments of the present disclosure provide a system for determining condition of sleeve bearing. More specifically, the condition of the sleeve bearing is determined based on changes in magnetic field due to leakage flux generated by the rotating machine or the magnetic flux induced due to the one or more magnetic tapes on the shaft. More specifically, the changes in magnetic flux is used to estimate shaft movement within the sleeve bearing and thereby determine condition of the sleeve bearing. Moreover, the lateral arrangement of each first pole of the plurality of first poles alternating with each second pole of the plurality of the second poles enables measurement of the speed of the shaft and radial movement of the shaft and the arrangement of each first pole of the plurality of first poles alternatively with each second pole of the plurality of second poles in a vertical direction enables measurement of axial movement of the shaft. Moreover, installation of the system for determining the condition of the sleeve bearing does not require preparation of the shaft surface during manufacturing as would be required with installing proximity probes. In general, existing rotating machines may be adapted easily and components of the system (i.e., the one or more magnetic sensors and/or the one or more magnetic tapes) may be arranged on the rotating machine thereby resulting in low-cost monitoring of sleeve bearing condition of existing rotating machines. Moreover, faulty conditions of the sleeve bearing may be determined based on inherent leakage flux present in rotating machines. Furthermore, the magnetic sensor already used to monitor condition of the rotating machine, for example, motor faults, broken motor, etc. may be used to perform additional functionality of determining condition of sleeve bearing.

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). For example, as an aid to understanding, the detail description may contain usage of the introductory phrases "at least one" and "one or more" to introduce recitations. However, the use of such phrases should not be construed to imply that the introduction of a recitation by the indefinite articles "a" or "an" limits any particular part of description containing such introduced recitation to inventions containing only one such recitation, even when the introductory phrases "one or more" or "at least one" and indefinite articles such as "a" or "an" (e.g., "a" and/or "an" should typically be interpreted to mean "at least one" or "one or more") are included in the recitations; the same holds true for the use of definite articles used to introduce such recitations. In addition, even if a specific part of the introduced description recitation is explicitly recited, those skilled in the art will recognize that such recitation should typically be interpreted to mean at least the recited number (e.g., the bare recitation of "two recitations," without other modifiers, typically means at least two recitations or two or more recitations).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following detailed description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for determining a condition of a sleeve bearing in a rotating machine, comprising:
   one or more magnetic sensors adapted to be mounted on at least a body of a rotating machine or proximate to a sleeve bearing of the rotating machine; and
   a processor electrically and communicatively coupled to the one or more magnetic sensors, wherein the processor is configured to:
   receive a magnetic flux measurement from each magnetic sensor of the one or more magnetic sensors, wherein the magnetic flux measurement is made in at least one of: proximate to the sleeve bearing and the body of the rotating machine; and
   determine a condition of the sleeve bearing based on the magnetic flux measurement, wherein the magnetic flux measurement corresponds to magnetic flux induced due to one or more magnetic tapes.

2. The system of claim 1, wherein the magnetic flux measurement corresponds to a leakage flux generated by the rotating machine.

3. The system of claim 2, wherein the processor is further configured to determine the condition of the sleeve bearing by:
   transforming the leakage flux generated by the rotating machine to a spectral representation; and
   determining the condition of the sleeve bearing based on the spectral representation, wherein the condition of the sleeve bearing is one of: a normal condition, an abnormal condition and a faulty condition.

4. The system of claim 3, wherein the faulty condition is one of: an oil whirl fault, an oil whip fault, and a bearing clearance fault.

5. The system of claim 3, wherein the processor is further configured to determine the condition of the sleeve bearing by:
   analyzing the spectral representation at one or more frequencies, wherein the one or more frequencies are determined based on one or more of: a line frequency (fL), a rotation frequency (fr), and one or more scaling values; and
   identifying the faulty condition of the sleeve bearing based on one or more spectral signatures at the one or more frequencies.

6. The system of claim 1, wherein the one or more magnetic tapes are disposed circumferentially on at least a portion of a shaft of the rotating machine.

7. The system of claim 6, wherein the processor is further configured to determine the condition of the sleeve bearing by:
   tracking a change in the magnetic flux induced due to the one or more magnetic tapes over a defined time period;

estimating a deviation in a centerline of the shaft for the defined time period based on the change in the magnetic flux, wherein the deviation represents one of: an axial movement of the shaft and a radial movement of the shaft; and determining the condition of the sleeve bearing based on the estimation.

8. The system of claim 1, wherein each magnetic tape of the one or more magnetic tapes comprises a plurality of first poles and a plurality of second poles.

9. The system of claim 8, wherein each first pole of the plurality of first poles is alternatively arranged with each second pole of the plurality of second poles in a lateral direction.

10. The system of claim 8, wherein each first pole of the plurality of first poles is alternatively arranged with each second pole of the plurality of second poles in a vertical direction.

11. A method for determining a condition of a sleeve bearing in a rotating machine, comprising:

receiving, by a processor, a magnetic flux measurement from each magnetic sensor of one or more magnetic sensors, wherein the magnetic flux measurement is made at, at least one of: proximate to a sleeve bearing and a body of the rotating machine; and determining, by the processor, a condition of the sleeve bearing based on the magnetic flux measurement, wherein the magnetic flux measurement corresponds to magnetic flux induced due to one or more magnetic tapes.

12. The method of claim 11, wherein determining the condition of the sleeve bearing comprises:

transforming, by the processor, a leakage flux generated by the rotating machine to a spectral representation; and determining, by the processor, the condition of the sleeve bearing based on the spectral representation, wherein the condition of the sleeve bearing is one of: a normal condition, an abnormal condition and a faulty condition.

13. The method of claim 12, wherein the faulty condition is one of: an oil whirl fault, an oil whip fault, and a bearing clearance fault.

14. The method of claim 12, wherein determining the condition of the sleeve bearing comprises:

analyzing the spectral representation at one or more frequencies, wherein the one or more frequencies are determined based on one or more of: a line frequency (fL), a rotation frequency (fr), and one or more scaling values; and identifying the faulty condition of the sleeve bearing based on one or more spectral signatures at the one or more frequencies.

15. The method of claim 11, wherein determining the condition of the sleeve bearing comprises:

tracking a change in the magnetic flux induced due to the one or more magnetic tapes over a defined time period;

estimating a deviation in a centerline of a shaft for the defined time period based on the change in the magnetic flux, wherein the deviation represents one of: an axial movement of the shaft and a radial movement of the shaft; and determining the condition of the sleeve bearing based on the estimation.

16. A system for determining a condition of a sleeve bearing in a rotating machine, comprising:

one or more magnetic sensors adapted to be mounted on at least a body of a rotating machine or proximate to a sleeve bearing of the rotating machine; and a processor electrically and communicatively coupled to the one or more magnetic sensors, wherein the processor is configured to:

receive a magnetic flux measurement from each magnetic sensor of the one or more magnetic sensors, wherein the magnetic flux measurement is made in at least one of: proximate to the sleeve bearing and the body of the rotating machine; and determine a condition of the sleeve bearing based on the magnetic flux measurement, wherein the magnetic flux measurement corresponds to a leakage flux generated by the rotating machine;

wherein the processor is further configured to determine the condition of the sleeve bearing by:

transforming the leakage flux generated by the rotating machine to a spectral representation;

determining the condition of the sleeve bearing based on the spectral representation, wherein the condition of the sleeve bearing is one of: a normal condition, an abnormal condition and a faulty condition;

analyzing the spectral representation at one or more frequencies, wherein the one or more frequencies are determined based on one or more of: a line frequency (fL), a rotation frequency (fr), and one or more scaling values; and identifying the faulty condition of the sleeve bearing based on one or more spectral signatures at the one or more frequencies.

17. The system of claim 16, wherein the faulty condition is one of: an oil whirl fault, an oil whip fault, and a bearing clearance fault.

\* \* \* \* \*